United States Patent Office 3,785,926
Patented Jan. 15, 1974

3,785,926
PROCESS FOR THE ENZYMATIC REPRODUCTION OF INFORMATIONALLY ACTIVE RNA
Diether Jachertz, Hannover, Germany (% Farbwerke Hoechst AG., Frankfurt am Main, Germany)
No Drawing. Filed Aug. 4, 1970, Ser. No. 60,922
Claims priority, application Germany, Aug. 16, 1969, P 19 41 709.5
Int. Cl. C12d 13/06
U.S. Cl. 195—28 N          1 Claim

ABSTRACT OF THE DISCLOSURE

A process for the enzymatic reproduction of informationally active RNA, by isolating a replicating enzyme from immunologically competent cells, incubating it together with (a) the informationally active RNA to be reproduced and (b) a cell-free system made from immunologically competent cells freed from the replicating enzyme, at pH 5, and isolating the newly formed informationally active RNA. The use of such informationally active RNA for vaccination.

---

It is already known that it is possible to synthesize informationally active ribonucleic acid (RNA) in immunologically competent cells by means of stimulation with an antigen. RNA can be transferred to other immunologically competent cells, in which it provokes the synthesis of antibodies against that antigen which caused the synthesis of the informationally active RNA in the first cited immunologically competent cells. Thus it is possible to prepare vaccines being free of antigens which nevertheless produce in the organism an immunity. The advantages of such vaccines in comparison with standard vaccines are obvious (see my copending U.S. application Ser. No. 207,670, filed Dec. 13, 1971, which application is a continuation of my then copending earlier filed U.S. application Ser. No. 736,989, filed June 14, 1968, and now abandoned). However, the disadvantage resides in the fact that the informationally active RNA required for the preparation of vaccines has to be prepared again and again in vitro by renewed stimulation of immunologically competent cells with the antigen.

Now, an enzyme, hereinafter called "replicase," has been found having the capability of reproducing informationally active RNA. The subject of the invention is therefore the production of replicase as well as the reproduction of informationally active RNA by means of replicase. The process comprises fractionating a cell-free system obtained from immunologically competent cells and adjusted to a pH of 5, isolating the fraction containing replicase, incubating this fraction together with the informationally active RNA to be reproduced and a cell-free system based on immunologically competent cells which is freed from replicase and adjusted to pH 5, and isolating the newly formed informationally active RNA in known manner.

The process of the invention makes possible the reproduction of informationally active RNA; the application of new antigen each time being no longer necessary. For the identical duplication of the informationally active RNA, the replicase requires a corresponding RNA matrix. This matrix is also informationally active RNA, which originally has been produced from immunologically competent cells or from cell-free systems based on such cells, by stimulation with an antigen (my copending U.S. application Ser. No. 207,670). For the stimulation of immunologically competent cell material, antigens and toxins from bacteria, viruses and their subunits, as well as snake venom, etc., are used.

Immunologically competent cells suitable as starting material for the isolation of replicase are above all peripheral leucocytes, spleen cells, lymph node cells, cells from the ductus thoracicus and peritoneal macrophages.

"Immunologically competent cells" are such cells which are able to react, upon a primary stimulation with an antigen, with the formation of informationally active RNA.

Suitable for the isolation of the replicase are known physical separation processes, for example electrophoresis, gel filtration, gradient centrifugation and others. Advantageously, the procedure is as follows:

The immunologically competent cells from which the replicase is to be isolated, are suspended in about the 5-fold volume of a weakly alkaline buffer, for example of a 0.1 molar "tris"-hydrochloric acid buffer having a pH of 8.0, then cooled to 0° C. and rapidly frozen by immersion in a carbonic acid/acetone freezing mixture. The ice containing the cells is finely crushed by mechanical means until it is thawing, and then frozen again. This operation has to be repeated at least ten times. However, the temperature is not allowed to rise above 2° C. The homogenized cells so obtained are centrifuged for 30 to 60 minutes, preferably for 45 minutes, at about 30,000 g. and a temperature of 0° C. The supernatant liquid remaining after the centrifugation at about 30,000 g. is then centrifuged for several hours at 100,000 g. The supernatant substance remaining after the centrifugation at 100,000 g. is adjusted to a pH of 5.0 to 4.5 by addition of acid, preferably of 0.2 N hydrochloric acid, thus resulting in the formation of a precipitate. This precipitate is centrifuged off at about 2,000 g. It is hereinafter called "pH 5-fraction." The sediment is washed, for example with 0.1 molar tris-buffer at pH 5, and dissolved, for example in 0.1 molar tris-hydrochloric acid buffer at pH 8.0. Small amounts of insoluble matter are separated by centrifugation and discarded. The clear supernatant liquid is fractionated by gel filtration, preferably in a Sephadex-G-200 column. The fraction having the distribution coefficient $Kd=0.38$ to 0.40 is the replicase-active fraction. The distribution coefficient is a material constant and describes the distribution of the molecules to be fractionated in the column.

The reproduction of the informationally active RNA is carried out as follows.

The following reactive components are brought together in one batch:

(1) About 1 part of the replicase containing fraction,
(2) About 2 parts of a solution of informationally active RNA containing about 0.1 $\mu$g/ml. of RNA, which serve as a matrix for synthesizing new informationally active RNA by means of replicase,
(3) About 2 parts of a pH 5 fraction which has been boiled for 10 minutes. (Boiling is necessary for the denaturation of the replicase contained in this fraction, which serves, in a most simple way, as supplier of elements necessary for the synthesis of new informationally active RNA.)

This preparation is incubated at about 37° C., and the newly synthesized informationally active RNA is isolated, after some time, preferably after 5 minutes, in known manner, for example with phenol, according to the Kirby process.

In order to obtain a vaccine, the informationally active RNA obtained according to the process of the invention can be further processed in known manner, for example with addition of aluminum hydroxide or aluminum phosphate.

Using the process of the invention and according to the antigen which was originally used for the formation of informationally active RNA, vaccines may be prepared for immunization against influenza in mice and in rhesus monkeys as disclosed in my copending application Ser.

No. 207,670, filed Dec. 13, 1971. The vaccines are effective at very low dosage; generally, $10^{-4}$ µg. of vaccine per kg. of body weight are sufficient.

The following examples illustrate the invention.

EXAMPLE 1

(Isolation of replicase)

1 mol of a sediment of human leucocytes are suspended in 5 ml. of 0.1 milar tris-hydrochloric acid buffer at pH 8.0, cooled to 0° C. and rapidly frozen in a carbonic acid/acetone freezing mixture. The ice containing the cells is finely crushed by mechanical means until it is thawing, and again frozen. This is repeated ten times, while the temperature is not allowed to rise above $+2°$ C. The homogenized cells so obtained are centrifuged for 45 minutes at 30,000 g. and a temperature of 0° C. The sediment being eliminated, the supernatant solution is centrifuged for 4 hours at 100,000 g. The supernatant liquid after this centrifugation at 100,000 g. is adjusted to a pH of 5.0 with 0.2 N hydrochloric acid, using a glass electrode. Thus, a precipitate (pH 5 fraction) is formed which contains the replicase and which is separated by centrifugation at 2,000 g. The sediment is washed with 0.1 molar trishydrochloric acid buffer at pH 5.0 and absorbed in 5 ml. of 0.1 molar tris-hydrochloric acid buffer at pH 8.0. The greater part of the sediment thus being dissolved, a small insoluble part is centrifuged off at 2,000 g. The clear supernatant liquid is introduced nto a Sephadex-G-200 column. The fraction having the distribution coefficient $Kd=0.4$, in total 2 ml., is isolated and frozen.

EXAMPLE 2

(Reproduction of the informationally active RNA by means of replicase)

A solution of informationally active RNA containing 10 10 µg. of RNA/ml., is diluted in a ratio of 1:100 with 0.1 molar tris-hydrochloric acid buffer at pH 8. 0.2 ml. of this solution are mixed with 0.2 ml. of the pH 5 fraction of Example 1 which has been boiled for 10 minutes, as well as with 0.1 ml. of a fraction containing replicase. The whole is incubated for 5 minutes at 37° C., and the newly synthesized informationally active RNA is isolated, using phenol, according to Kirby. The RNA content determined in the so obtained solution is 45 µg. of RNA/ml., which means a 2,250-fold reproduction. This quantity of RNA contains about 100,000 to 500,000 vaccination doses for guinea pigs having a medium weight of 250 g.

What is claimed is:

1. A process for the enzymatic reproduction of informationally active ribonucleic acid which comprises the steps of:
   (a) preparing a replicase containing cell-free system from a suspension of immunologically competent replicase containing cells,
   (b) removing the solid particles from said suspension to result thereby in a liquid cell-free system,
   (c) adjusting the pH of said system to between 4.5 and 5 to precipitate a pH 5 fraction,
   (d) dissolving a first portion of said pH 5 fraction in a buffer solution at a pH of about 8,
   (e) isolating from said solution the replicase fraction therefrom,
   (f) boiling a second portion of said pH 5 fraction to remove all of any replicase contained in said second portion,
   (g) incubating said isolated replicase fraction together with said boiled pH 5 fraction in thep ersence of the informationally active ribonucleic acid to be reproduced, and
   (h) isolating the newly synthesized informationally active ribouncleic acid thus formed.

References Cited

Speigelman: Chemical and Engineering News, vol. 45, No. 33, pp. 151–156 (August 1967).

Speigelman: Proc. Nat. Acad. Science, vol. 54, pp. 919–926 (1965).

ALVIN E. TANENHOLTZ, Primary Examiner

U.S. Cl. X.R.

424—167